UNITED STATES PATENT OFFICE.

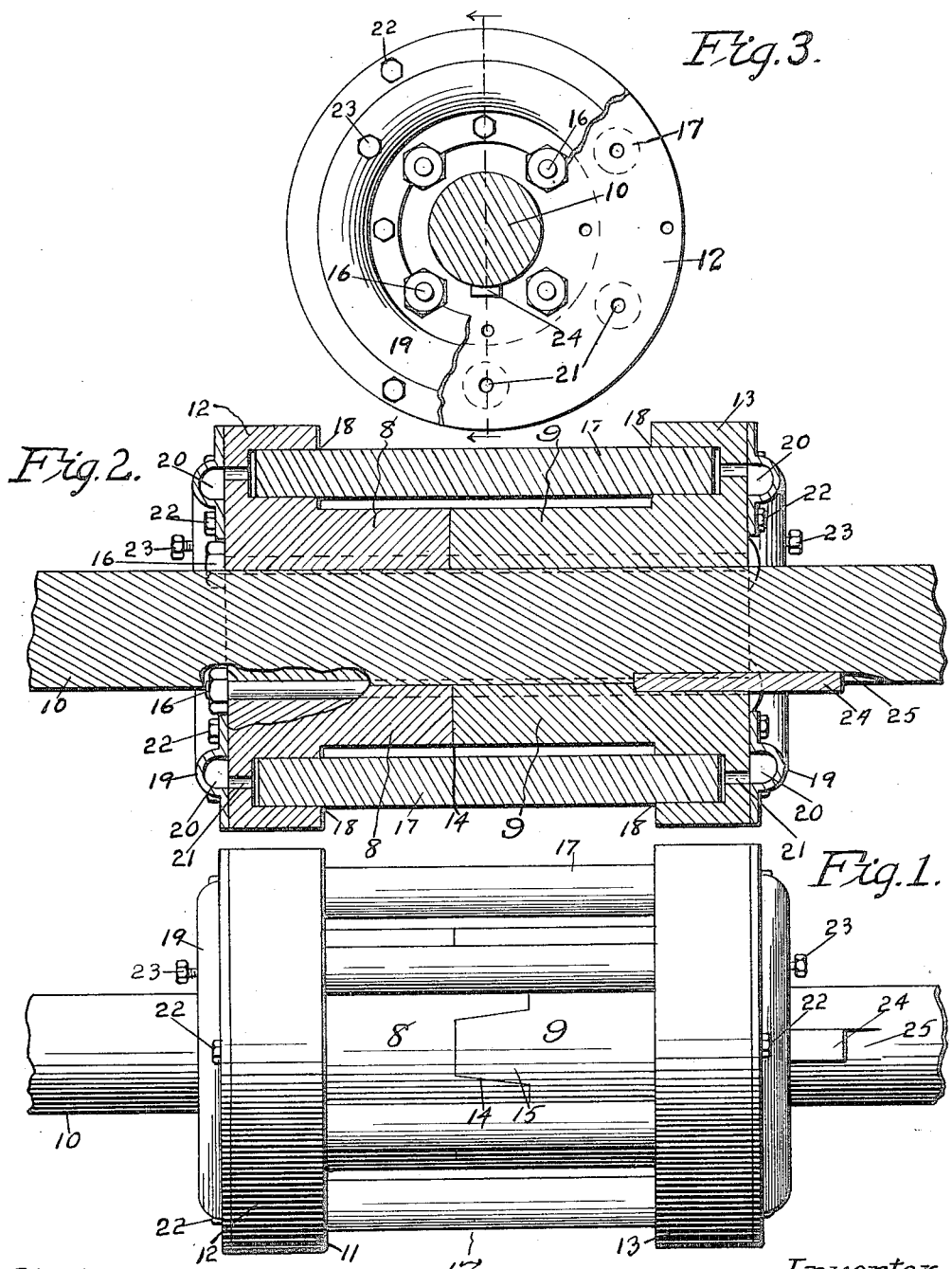

GEORGE H. WILSON, OF MINNEAPOLIS, MINNESOTA.

ROLLER GEAR-WHEEL.

1,140,427.  Specification of Letters Patent.  Patented May 25, 1915.

Application filed October 4, 1913. Serial No. 793,410.

*To all whom it may concern:*

Be it known that I, GEORGE H. WILSON, a citizen of the United States, residing at Minneapolis, in the county of Hennepin and State of Minnesota, have invented certain new and useful Improvements in Roller Gear-Wheels, of which the following is a specification.

My invention relates to an improvement in roller gear wheels, and has for its object to provide a device by which the rollers in a roller gear wheel may be lubricated with hard oil in a very efficient manner with respect to replenishment of the lubricant.

A further object is to provide such a lubricating means so placed that the working action of the lubricating material will tend to force dirt and grit out and away from the roller bearing. And a further object is to provide a roller gear wheel in which new rollers may be placed with a minimum of trouble and time.

The rollers of roller gear pinions are subject to heavy wear and to breakage, and in ordinary roller gear pinions, when one or two rollers break down or all become worn out, the wheel is thrown away and a new one purchased on account of the lack of new rollers on hand or the difficulty of inserting them in the wheel.

The full objects and advantages of my invention will appear in connection with the detailed description thereof and are particularly pointed out in the claims.

In the drawings, illustrating the application of my invention in one form,—Figure 1 is a plan view of a pinion showing my invention as it appears when in use. Fig. 2 is a transverse section showing in detail the method and working of my lubricating device. Fig. 3 is an end view of a pinion showing my device partly broken away.

This pinion comprises a hub 8, 9, consisting of two nearly duplicate sections 8 and 9, divided transversely in an irregular manner so that the sections interlock. As shown, one section 8 has a recess 14, into which is fitted a lug 15 on the abutting section 15. One hub section is keyed to the shaft 10 by a key 24. Integral with hub section 8 at the end thereof, is a thick flange 11, and the other section 9 is likewise provided with a similar flange 13. The sections thus described are secured together with bolts 16, shown in Fig. 3.

The teeth of this gear wheel are formed of rollers 17 which are inserted into bearings 18 in each flange so that when the rollers 17 are inserted into the bearings 18 and the bolts 16 are drawn up tight a gear wheel is formed having its teeth spaced the right distance apart but formed of rollers and constructed to readily turn in the bearings.

From each end of each roller bearing 18, an oil duct 21 leads in an axial direction to the lateral face or end of the pinion. Mounted upon each end of the pinion by means of screws 22, is an annular cap 19, which snugly fits the contacting surface except that each cap 19 is provided with an interior annular groove 20, which has the function of a reservoir for lubricant, either hard or fluid. The grooves 20 of course cover the entrances of the distributing ducts 21. Each cap is provided with a feed-screw 23, by turning which forwardly, hard oil may be fed into ducts 21. Liquid oil in escaping from the roller bearings 18 will carry out dust and sand, thus prolonging the life of the journals and bearings. This permits the use of the roller in exposed position for long periods of time without danger of the cutting out of the rollers. Should the rollers become worn or damaged it will be found very easy to replace same by unbolting the sections and removing the old rollers.

At the proper intervals the reservoirs 20 are quickly refilled with hard oil by removing them and placing it in the grooves 20. If fluid lubricant is used, simply remove the screws 23, fill, and replace said screws, or corks or wooden plugs can be used.

To replace a roller or rollers, the nuts are removed from the four bolts 16 and the hub section that is not keyed to the shaft is slipped upon the shaft until the roller or rollers can be removed.

I claim:

1. A roller gear wheel comprising a hub which is transversely divided into separable sections, each section being provided with an annular flange, the flanges having correspondingly positioned bearing recesses extending from the inner surface of said flange to a point adjacent the outer surface thereof and having lubricating ducts extending from the center of said recesses to the outside of the flange, roller teeth having their ends journaled in corresponding pairs of said recesses, said teeth being shorter than the distances between the bottoms of said pairs of recesses, and a circular channel member removably secured to the ends of said flanges so that said members will overlie and inclose all of said ducts and a closed channel in communication with said ducts will be formed between the channel of the member and the face of the flange.

2. A roller gear wheel comprising a hub which is transversely divided into separable sections, each section being provided with an annular flange, the flanges having correspondingly positioned bearing recesses extending from the inner surface of said flange to a point adjacent the outer surface thereof and having lubricating ducts extending from the center of said recesses to the outside of the flange, roller teeth having their ends journaled in corresponding pairs of said recesses, said teeth being shorter than the distance between the bottoms of said pairs of recesses, a circular channel member removably secured to the ends of said flanges so that said member will overlie and inclose all of said ducts and a closed channel in communication with said ducts will be formed between the channel of the member and the face of the flange, and a screw-bolt threaded through the wall of said member and into said channel for forcing lubricant into the ducts.

In testimony whereof I affix my signature in presence of two witnesses.

GEORGE H. WILSON.

Witnesses:
H. A. BOWMAN,
ROBERT W. MUIR.

Copies of this patent may be obtained for five cents each, by addressing the "Commissioner of Patents, Washington, D. C."